INVENTOR.
William O. Martin

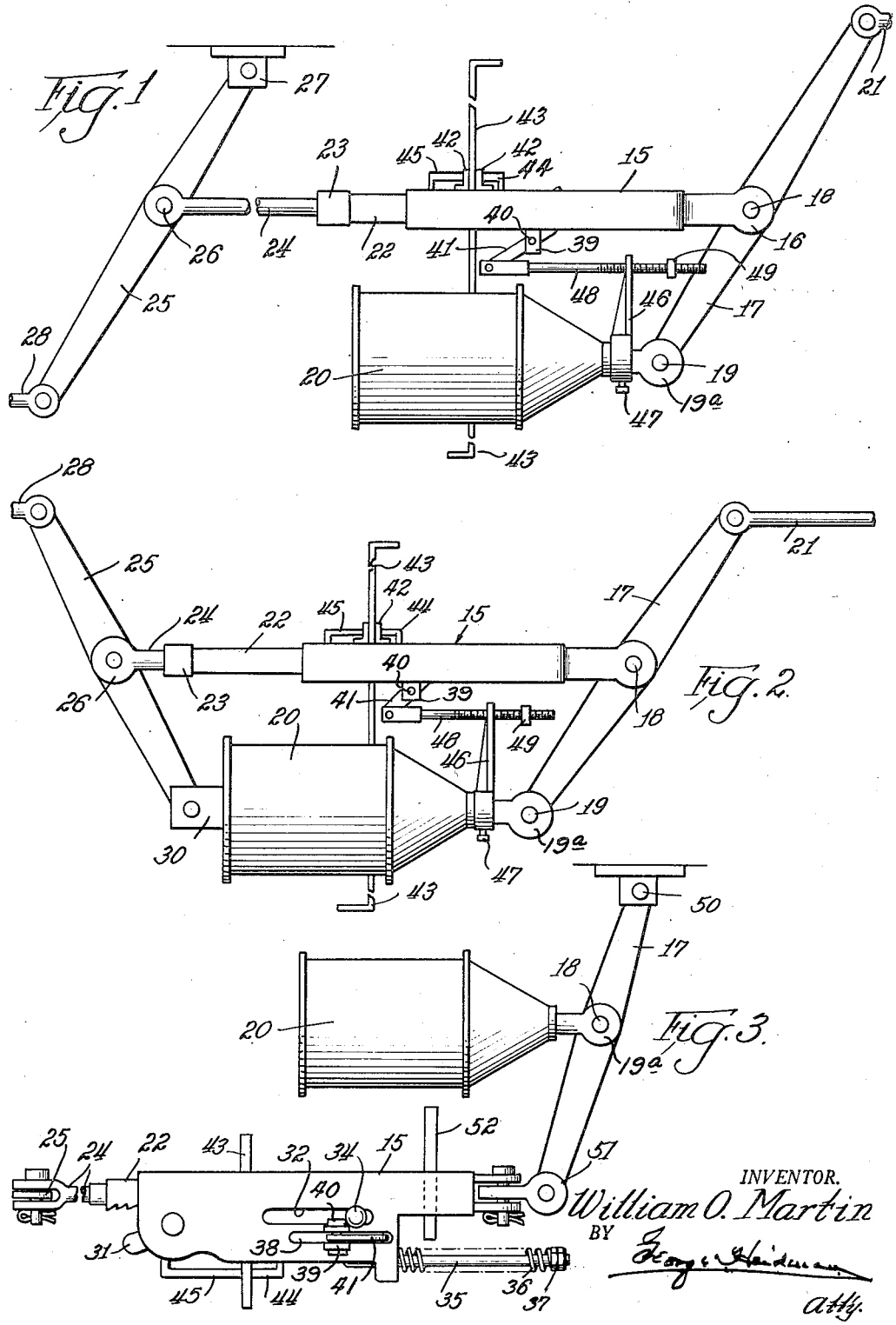

Patented July 10, 1951

2,559,779

UNITED STATES PATENT OFFICE 2,559,779

RAILROAD BRAKE SLACK ADJUSTER

William O. Martin, Fort Smith, Ark.

Application August 13, 1948, Serial No. 43,995

6 Claims. (Cl. 188—200)

My invention relates more particularly to automatic slack adjusters for the brakes of locomotive tenders and/or the brakes of railroad freight cars whereby undue play or slack in the brake applying mechanism will be automatically taken up or adjusted in order that the same and desired brake force or braking pressure may be provided and substantially equal piston travel of the respective brake cylinders obtained.

As the respective brake cylinders receive substantially the same amount of compressed air, it is apparent that a lesser brake applying pressure is obtained by a longer traveling piston (for example as is caused by worn brake shoes) than is the case with a piston requiring a shorter travel to effect brake application and as a result unequal braking force would be applied to cars having unequal piston travels. The serious conditions resulting from such unequal brake application are too well known to require recitation.

The object of my invention is to provide positively operating mechanical means of comparatively simple construction, adapted to automatically maintain a predetermined and uniform brake cylinder piston travel by progressively shortening the cylinder lever connecting rod as the piston travel increases.

It is also an object of my invention to provide means whereby the slack in the brake rigging may be released, for the purpose of renewing brake shoes, etc., from the side of a car, whereby the necessity of getting underneath the car for such purposes is eliminated; and also to provide means whereby the brake cylinder piston travel will be automatically readjusted in keeping with brake shoe wear, thereby eliminating the necessity of making any manual adjustments or readjustments.

The objects and advantages of my invention will be readily comprehended from the following detailed description of the accompanying drawings wherein—

Figure 1 is a top plan view of my improved slack adjuster as applied to a locomotive tender, the usual types of freight cars, flat cars or gondola cars at present in use.

Figure 2 is a similar view of a modification wherein the dead lever is pivotally secured to the air cylinder pressure head.

Figure 3 is a side elevation of a modified application of my improved slack adjuster to a vertical lever as applied to a hopper car.

Figure 4:
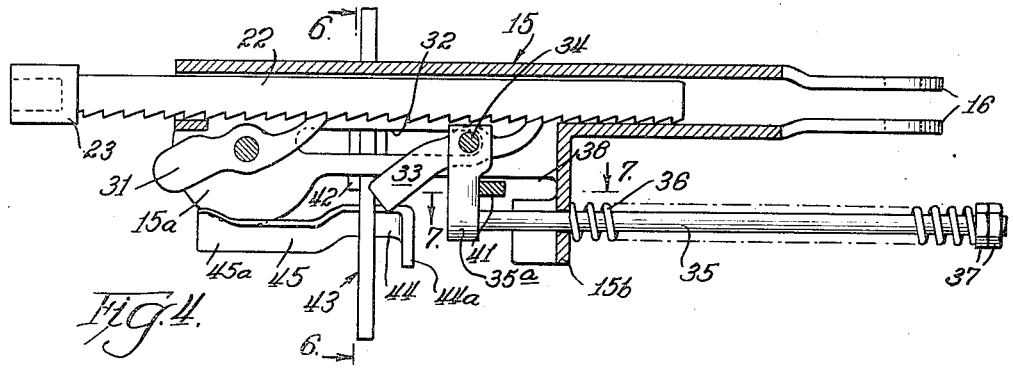
Figure 4 is a longitudinal sectional view through the housing of the slack adjuster as employed in Figures 1 and 2 with the lever connections at the ends of the adjuster omitted.
Figure 5:
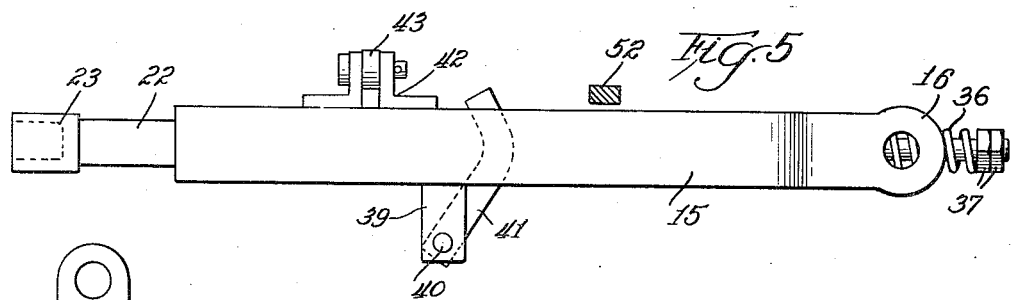
Figure 5 is a top plan of the slack adjuster with special operating lever and adjusting stop as employed on hopper cars or when vertical brake cylinder levers are used.
Figure 6:
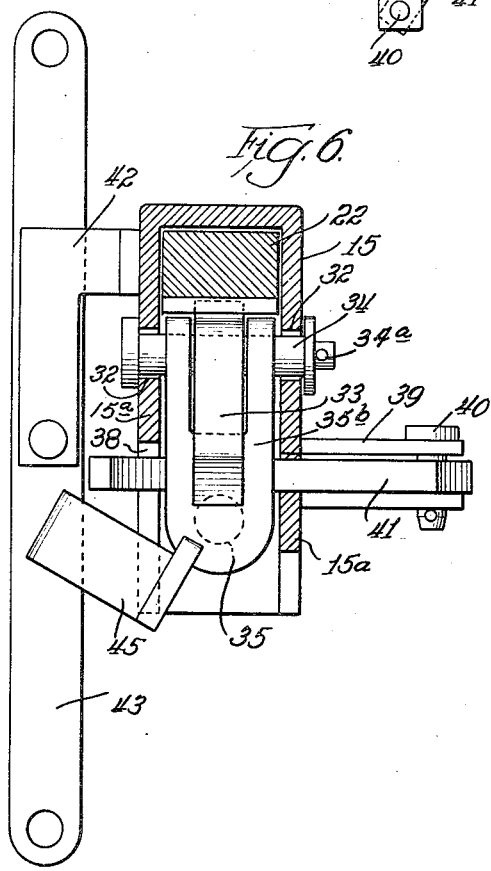
Figure 6 is a transverse sectional view taken substantially on the line 6—6 of Figure 4 looking in the direction of the arrows.

My improved brake slack adjuster as disclosed in Figures 1, 2, 4, 6 and 7 of the drawings involves a suitable elongated open ended main frame or housing 15, provided with a fork or apertured extensions 16, 16 to receive the cylinder live lever 17 therebetween; the lever being pivotally connected intermediate its ends at 18, with one end pivotally connected at 19 to the piston rod push rod 19a of the brake cylinder 20; while the other end of the lever 17—in the exemplifications shown in Figures 1 and 2—is pivotally connected to the top rod 21 of the brake rigging not shown.

The frame or housing 15 is provided with a slidable rack bar 22, adapted to move inwardly through the left hand open end of the housing and its outer end enlarged and tapped at 23 for securing the connecting rod 24 thereto. The outer end of rod 24 is forked to receive the dead or floating lever 25 to which it is pivotally connected at 26. One end of lever 25—in the exemplification shown in Figure 1—is pivotally connected to a suitable bracket 27 which is secured to a stationary sill or to a suitable part of the locomotive tender underframe, while the other end is pivotally secured to a top rod 28 of the brake rigging.

In the exemplification shown in Figure 2, the dead lever 25 at an intermediate point is pivotally connected to a connecting rod 24, which in turn is threaded into a tapped hole in the enlarged end of the rack bar 22; with one end of the dead lever pivotally mounted in a suitable bracket 30 secured on the pressure head of the cylinder 20; while the opposite end of the dead lever 25 has pivotal connection with the rod 28.

The forked end 16 of the main frame 15, and the connecting rod 24 at the outer end of the rack bar 22 provide connection means between the brake cylinder live lever 17 and the dead or floating lever 25 on railway cars provided with conventional air brakes.

One end of the frame or housing 15 is formed with depending parallel side wall portions 15a (see Figs. 4 and 6) between which a counterweight pawl 31 is pivotally mounted intermediate its ends so as to normally maintain its upper end in engagement with the teeth of rack bar 22. The side walls 15a of the housing 15, forward of the pawl 31, are provided with the longitudinal slots 32 whereby a simple means of motive or operating power is provided for automatic operation of the device; said means consisting of a counterweighted pawl 33, loosely mounted on a transversely disposed pin 34 which extends through the side wall slots 32, see Figures 4 and 6; the rod or pin 34 being held in the guide slots 32 in any suitable manner, such as cotter pin 34a. The pin 34, with pawl 33, is adapted to be moved lengthwise of slots 32 in the side walls of frame 15. The pin 34 also has the upwardly bent end 35a of the elongated rod 35 loosely mounted thereon, see Figure 6; the end 35a preferably terminating in a clevis or jaw—which straddles the pawl 33—for loosely connecting the rod 35 to the pin 34. The rod 35 passes loosely through the depending end wall 15b (Figure 4) of the main frame 15 and its extended end is provided with a suitable coil spring 36; a portion of which is shown at 36 in Figure 4. The inner end of the spring 36 is held against the frame-wall 15b while the outer end is maintained on the rod 35 by a suitable nut as at 37. The outer end of the rod 35 is threaded for a suitable distance to permit the nuts 37 to screw lengthwise thereof to compress the spring 36 and control the spring pressure. As is apparent, the spring 36 exerts a constant pressure which tends to shift the rod 35 outwardly and at the same time tends to force the pin 34 with the pawl 33 toward the right in Figure 4.

Figure 7:
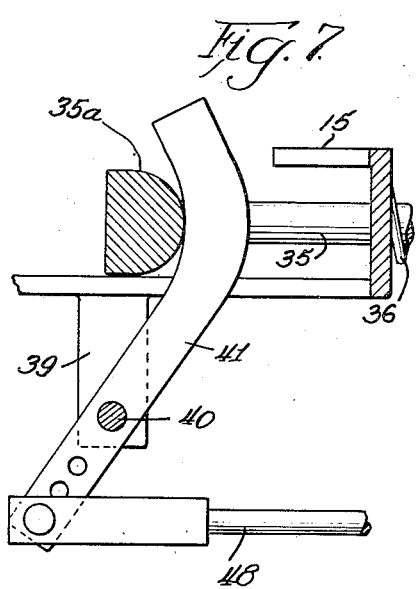
Figure 7 is a detail sectional view taken substantially on the line 7—7 of Figure 4 looking in the direction of the arrows.

One of the frame or housing side walls, beneath the horizontal plane of slot 32, is provided with an elongated horizontal slot 38 which extends forwardly beyond the end of slot 32 (see Figure 4) and terminates adjacent the housing end wall 15b, see Figure 4. The housing side wall, intermediate the ends of slot 38, is provided with a suitable bracket shown in the form of a pair of spaced vertically arranged lugs, one of which is shown at 39 in Figures 1, 2, 5 and 7; the lugs being apertured to receive a pivot pin 40 for pivotally securing an arcuate lever 41; the free end of the lever 41 passes through the slot 38 in the frame or housing in advance of the angular upstanding end 35b of rod 35. That is to say, the arcuate lever 41 passes through slot 38 in the housing 15 intermediate the forked or angular end of rod 35 and the end wall 15b of the housing and with the lever 41 curving or extending in a rearward direction as shown in Figure 7.

The opposite end of the housing or main frame 15 is provided with a suitable bracket 42 (see Figures 1, 2 and 5) in which a transversely disposed pawl release lever 43 is tiltably mounted intermediate its ends. This lever 43, intermediate its ends, is provided with laterally disposed arms 44 and 45, see Figure 4. The arm 44 is bent at right angles with its end 44a disposed upwardly into the housing and into the path of the weighted end of pawl 33; and arm 45 is bent at right angles to provide the long end portion 45a which extends lengthwise of the housing or main frame 15 and into the path of weighted arm of pawl 31 when lever 43 has been tilted about its pivot point in bracket 42. The laterally disposed arms 44 and 45 extend from the lever 43 toward opposite sides of the lever's pivotal point and cause this end of the lever to normally or automatically swing downward and the lever 43 to normally extend in an inclined manner. That is to say, the upwardly bent end 44a is located immediately beneath the weighted end of pawl 33, while the long end 45a is located immediately beneath the weighted end of pawl 31 (see Figure 4). When lever 43 automatically swings to its normal position, the ends 44a and 45a will be out of contact with the pawls. Pawl release lever 43 may be controlled from either side of the car by rods or other suitable means attached to the ends of lever 43 whereby it may be tilted, causing pawls 33 and 31 to be tilted on their pivot points out of contact with the rack bar 22. When the pawls are out of mesh with the rack bar, the connecting means—namely, housing 15 and rack bar 22—will move into distended initial condition through the action of the levers 17 and 25 as well as the truck levers, not shown.

An arm 46 (see Figures 1 and 2) has an enlarged collar portion for receiving the piston push rod 19a and is secured thereto in any suitable manner, as by the set-bolt at 47, and the other end of the arm 46 is apertured for passage of a pull rod 48, Figures 1 and 2. One end of pull rod 48 preferably is provided with a clevis or jaw for pivotally securing the rod 48 to the lever 41, Figures 1, 2 and 7, while the other end of rod 48 is preferably threaded and extends through arm 46 and the outer end provided with a nut 49 which is adjusted lengthwise of rod 48 to induce automatic operation of the slack adjuster; the nut 49 is positioned on rod 48 so that arm 46 will not normally engage the nut until the piston push rod 19a of cylinder 20 has moved outwardly beyond the predetermined limit.

In applying my slack adjuster to a railway car with conventional brake rigging, by pivotally attaching the main frame or housing 15 to the cylinder live lever 17 and pivotally connecting one end of rod 24 to the dead or floating lever 25, an automatically regulable connection between the live lever and the floating lever is provided.

In operation of the invention as disclosed in Figures 1, 2, 4, 6 and 7, when the brake cylinder piston push rod 19a travel, during brake application exceeds the prearranged distance between the nut 49 on rod 48 and the push arm 46, the latter engages nut 49 and any further travel of the piston push rod will pull rod 48 forwardly.

This movement of the pull rod 48 will exert a pull on one end of lever 41, cause its free end (which extends through slot 38 in the frame 15) to slidingly engage the angular pawl-pivot controlling end of spring bar or rod 35, and force the rod 35 rearwardly against the action of its spring, thereby also moving the pivot 34 and actuating pawl 33 rearward in slot 32. This inward or rearward movement of pawl 33 brings it into engagement with another tooth of rack bar 22 or (depending on the extent of play or slack in the brake rigging) nearer the left hand end in Figure 4.

This rearward or inward movement of rod 35 places spring 36 under greater compression. When the brakes are released and the cylinder piston and the brake levers return to normal position, carrying push-arm 46 with it, spring 36 forces rod 35 back to normal position carrying pawl 33 with it. Pawl 33 (which has engaged another or rearward tooth) causes the rack bar 22 to move correspondingly farther into the housing 15, that is to the right in Figures 1, 2 and 4, thereby shortening the composite connecting rod (15—22—24) between the cylinder or live lever 17 and the dead or floating lever 25 changing the angularity of levers 17 and 25. Reverse or return movement of the rack bar 22 is prevented by locking or holding pawl 31. The return of the piston to normal position carries arm 46 with it out of operative relation with the nuts 49 on rod 48 and releases arcuate lever 41. As is apparent, the automatic motive power for actuating the slack take-up mechanism is provided by compression of sturdy spring 36.

In order to obtain a smoother and maximum effect, I prefer to provide the forward edge of the upturned end of rod 35 with an arcuate fulcrum providing or rounded surface 35ª (see Figure 7).

The operations of the pawl carrying, spring actuated, rod 35 and rod and pawl repositioning lever 41, are repeated as slack in the brake rigging, or brake shoe wear occurs. When the brake shoes become too worn and allow the cylinder piston to travel beyond the point of its maximum power, the pawl release lever 43 is tilted about its pivot, causing fingers 44 and 45 to engage the weighted ends of holding pawl 31 and of rack bar actuating pawl 33, thereby swinging the pointed ends of the pawls out of engagement with the rack-bar and releasing the adjuster mechanism, levers 17 and 25 and the brake beams to permit brake-shoe replacement. The mechanism is then returned to its initial position, as shown in Figure 1, with the rack bar 22 drawn partly out of housing or main frame 15 and with the pawl carrying rod 35 drawn forward with actuating pawl 33 positioned at the forward end of slot 32.

In Figure 3, I illustrate the application of my improved slack adjuster to a hopper car wherein the cylinder lever or live lever 17 is vertically disposed with its one end pivotally connected at 50 to a fixedly mounted bracket which is secured to the car frame, while the intermediate portion of line lever 17 is pivotally connected at 18 to the push rod 19ª of the cylinder 20. The opposite end of the lever 17 is shown connected by means of an adapter 51 to the bifurcated end of the frame or housing 15 of the adjuster mechanism which is substantially similar to that previously described, having side walls provided with slot 32 for receiving the pivot pin 34 whereby the actuating pawl 33, similar to that shown in Figure 4, is pivotally secured to the upturned end (see Figure 4) of the spring controlled pull rod 35. The side wall of the housing beneath slot 32 is also provided with a slot for receiving a transversely disposed lever 41 pivotally secured at 40 to brackets 39 on the housing (see Figure 5) while the inner end of lever 41 is intended to be disposed between the depending end wall of the housing and the inner or pawl carrying end of pull rod 35, all as heretofore described. The housing or frame 15, as in the previously described figures, has a rack bar 22 slidably mounted therein and the latter held against outward movement by the detent or holding pawl 31. The end of the rack bar is shown provided with a connecting rod at 24 for pivotally connecting the rack bar to the end of the floating lever 25, the mechanism, as in the previously described construction, being provided with the release lever 43 with its side arms 44 and 45 whereby the counter-weighted pawls 31 and 33 (arranged in the housing 15 as in Figure 4) may be lifted or moved out of engagement with the rack bar when it is desired to release the adjuster mechanism for the replacement of shoes in the brake rigging.

The slack take-up mechanism is substantially the same as in Figures 1, 2 and 4, except (by reason of the cylinder and brake lever locations on hopper cars) the piston push arm 46 and the arcuate lever pull rod 48 are omitted; the arcuate lever 41 being controlled as hereinafter described.

At a suitable point on the car body or frame, I provide a depending plate or rigid stop member 52 which depends into the path of the free end of lever 41 which, as in the previously described construction, extends across the path of the inner upturned pivot pin 34 carrying end of the spring controlled rod 35. The stop plate or member 52 is so positioned relative to the forward movement of the housing 15 during brake application that when the cylinder push rod exceeds its predetermined amount of travel, the stop plate will engage the free end of lever 41. This will cause the rod 35 with pawl 33 and its pivot point 34 to be held against further forward travel with the housing 15, compression spring 36, and permitting the actuating pawl 33 to engage with a succeeding tooth or teeth on the rack bar 22; corresponding to the degree of excessive movement of the cylinder push rod beyond its predetermined extent of outward travel. Upon retraction of the cylinder piston the spring controlled rod 35, through pawl 33, will cause rack bar 22 to be drawn into housing 15, thereby shortening the tie connection between live lever 17 and dead lever 25. Except for the method of controlling the actuating pawl and its spring rod, the device and operation of the structure shown in Figure 3 is practically identical with that of the previously described structure.

The exemplifications of the invention are believed to be the simplest embodiments, but structural modifications may be made without, however, departing from the spirit of the invention as defined in the appended claims.

What I claim is:

1. A brake slack adjuster for railroad cars comprising, in combination with the brake cylinder piston push rod, the live lever and the floating lever of a railroad car brake rigging with the cylinder piston push rod pivotally connected to the live lever; contractible tie means between said levers and uncontrolled thereby and consisting of an elongated housing one end whereof is pivotally connected to the live lever of the rigging; a rack bar slidable in said housing with its outer end pivotally connected to the dead or floating lever of the rigging; a pawl pivotally mounted intermediate its ends on the side walls within said housing with its tail end depending beneath its pivot while the other end engages the rack bar against outward movement; a spring controlled pawl carrying rod slidably supported by an end wall of the housing and extending parallel with the housing; a pawl gravity controlled arranged in the housing in mesh with said rack bar and pivotally secured intermediate its ends to said rod, adapted to force the rack bar into the housing; an arcuate lever pivotally secured intermediate its ends to said housing and disposed through the housing across the path of said last mentioned pawl; a pull rod pivotally secured to an end of said arcuate lever and provided with regulable means whereby the pull rod operation accords with the maximum slack and brake shoe wear; a laterally disposed arm secured to the cylinder piston push rod and having regulable operative and supporting engagement with said pull rod whereby the latter may be moved with the piston push rod when the latter travels outwardly beyond a predetermined point, said arcuate lever swung about its pivot and said spring controlled pawl carrying rod thereby retracted toward the opposite or floating lever end of said housing and its pawl brought into mesh with a succeeding tooth or teeth of the rack bar, said pull rod and arcuate lever releasing said pawl carrying rod when the cylinder push rod is retracted, permitting said pawl carrying rod to return to normal position and thereby shift said rack bar a distance in keeping with the extent of pawl carrying rod retraction.

2. In a brake slack adjuster for railroad cars, the combination of the brake cylinder piston push rod, the live lever and the floating lever of a railroad car brake rigging; an automatically regulable tie connection between the live lever and the floating lever for inducing the floating lever to move with the live lever, said connection consisting of an elongated open ended housing pivotally connected with the live lever and a rack bar slidably arranged in the housing, with its outer end pivotally connected to the floating lever; a pawl pivotally secured to the side walls within said housing in constant mesh with said rack bar whereby said tie members are held against extensible movement; a spring controlled rod slidably mounted in a wall of the housing; a pawl pivotally secured to the inner end of said rod and arranged in constant mesh with said rack bar whereby contraction of the housing and rack bar may be induced; a lever pivotally secured intermediate its ends to said housing with one end disposed through said housing across the path of said last mentioned pawl; a pull rod secured to the outer end of said last mentioned lever; and an arm secured to said piston push rod and having regulable operative relation with said pull rod, whereby the latter is actuated when the piston push rod exceeds its predetermined normal outward travel, whereby the operative relation between said last mentioned pawl and said rack bar will be shifted a distance corresponding with the degree of excessive piston push rod travel and said tie connection shortened upon retraction of the piston push rod.

3. In a brake slack adjuster, the combination of a brake cylinder push rod, the live lever and the floating lever of a railroad car brake rigging, an elongated housing pivotally connected at one end with the live lever and a telescopically arranged rack bar slidable in said housing with its outer end pivotally connected with the floating lever, said housing and rack bar constituting tie means between the two levers to make them operate in unison, said tie means normally being in distended condition; a pivoted pawl for holding the rack bar against outward movement; a rack bar actuating pawl, a spring controlled rod with which said actuating pawl is pivotally connected to move therewith, a laterally movable lever disposed through said housing across the inner end of said rod whereby said spring controlled rod is forced lengthwisely of the housing and said actuating pawl moved rearward into engagement with succeeding tooth or teeth of the rack bar when said lever is oscillated, a regulable pull rod connected with said last mentioned lever; and an arm mounted on the cylinder piston push rod and slidably connected with said pull rod whereby the latter is actuated when the cylinder push rod exceeds its normal predetermined travel, said pull rod with the laterally movable lever being released when the cylinder piston push rod returns to normal position permitting said spring controlled rod to return to initial position thereby inducing the actuating pawl to shift the rack bar farther into the housing and correspondingly shorten the tie means between the live lever and the floating lever; and a manually controlled lever operable from the car sides whereby both of said pawls simultaneously may be lifted out of operative relation with said rack bar and said tie means permitted to return to initial distended condition through the movement of the brake rigging levers.

4. In an automatic brake slack adjuster for railroad car brake rigging, the combination of a brake cylinder push rod, a live lever and a floating lever of the brake rigging; an elongated open ended housing having a longitudinal opening in its bottom and with one of its ends pivotally connected to said live lever and having depending side walls; a rack bar slidably mounted in said housing with its teeth disposed toward said bottom opening and its outer end operatively connected with the floating lever; a gravity actuated pawl pivotally mounted intermediate its ends in said housing and in engagement with said rack bar whereby the latter is held against outward movement; a spring carrying rod disposed lengthwise of the housing and slidable in a depending wall of the housing and having an angular inner end extending into the housing and beneath said rack bar; a pivoted gravity actuated pawl arranged in mesh with the rack bar and pivotally connected to the upturned angular end of said rod; a pivoted arm arranged in the housing forward of said angular end adapted to have operative relation with the cylinder piston push rod when the latter exceeds a predetermined amount of outward travel, whereby said arm is oscillated across the path of said angular end of the pawl carrying rod and the latter with said pawl forced rearwardly of the housing causing the last mentioned pawl to engage a succeeding tooth or teeth of the rack bar, whereby the rack bar is shifted farther into said housing when the cylinder piston push rod retracts and said pawl carrying spring controlled rod returns to its normal position, a tiltable laterally diverging lever arranged beneath the free ends of said gravity actuated pawls and operable from the car sides whereby the pawls may be tilted out of mesh with said rack bar, the latter permitted to move outwardly in said housing as the live lever and floating lever swing back to initial positions.

5. In a brake slack adjuster for railroad cars comprising the combination of the brake cylinder piston push rod, the live lever and the floating lever of the car brake rigging; a tie connection between the two levers composed of an open ended and open bottom housing having side walls provided with slots of preselected length and one end of the housing having pivotal connection with the live lever and a rack bar slidable in the housing with its outer end having pivotal connection with the floating lever whereby the two levers are made to move in unison; and an automatically seating pawl whereby the housing and rack bar are held against separating movement, a spring controlled rod adapted to move parallel with said housing and the cylinder piston push rod and a rack bar engaging pawl pivotally connected to the inner end of said rod; and means, operatively associated with the cylinder piston push rod, for moving said rod with said pawl rearwardly in said housing during piston push rod outward movement beyond its predetermined amount of travel and causing the spring of said rod to be compressed and said pawl to engage a succeeding tooth or teeth of the rack bar, whereby the rack bar is caused to slide forwardly in the housing by expansion of the spring on said rod when said last mentioned-means is released during return movement of the piston push rod to normal position.

6. In a brake slack adjuster for railroad freight cars provided with a live lever, a dead or floating line and a power actuated cylinder piston push rod pivotally connected with the live lever, the combination of an automatically regulable tie connection pivotally connected with intermediate portions of both of said levers and consisting of an elongated open ended housing having an open bottom and side walls provided with lengthwisely disposed slots, one end of said housing being pivotally connected to the live lever, a rack bar slidably arranged in the housing with the outer end of the bar pivotally connected with the dead lever, a holding pawl pivotally mounted in the housing and normally engaging said rack bar, said side wall slots being arranged forward of said holding pawl with one slot arranged above the horizontal plane of the other slot, a spring controlled rod slidably supported by the housing and its inner end formed to extend upwardly within the housing, an actuating pawl pivotally supported by said inner end of said rod with the pawl pivot supported and slidable in one of said housing side wall slots, said pawl being in mesh with said rack bar, an arcuate lever disposed transversely through the other of said housing side wall slots and forward of the pivot of the actuating pawl and pivotally secured to said housing, a regulable pull rod pivotally secured at one end to the outer end of said arcuate lever, and an angularly disposed arm secured on said piston push rod and having operative sliding connection with said pull rod whereby the latter is actuated when the piston push rod exceeds its predetermined normal outward travel thereby causing said arcuate lever to oscillate so as to hold the actuating pawl against further forward travel with the housing during brake applying movement of the live lever and thus cause the actuating pawl to engage a succeeding tooth or teeth of said rack bar and induce contraction of the tie connection when the piston push rod recedes to normal position.

WILLIAM O. MARTIN.

REFERENCES CITED

The following references are of record in the file of this patent:

UNITED STATES PATENTS

| Number | Name | Date |
| --- | --- | --- |
| 1,770,043 | Richards | July 8, 1930 |
| 1,947,405 | Camp | Feb. 13, 1934 |
| 2,127,920 | James | Aug. 23, 1938 |
| 2,138,235 | Hicks | Nov. 29, 1938 |